US011154830B2

(12) United States Patent
Le Coz (10) Patent No.: US 11,154,830 B2
(45) Date of Patent: Oct. 26, 2021

(54) DEVICE FOR LIMITING ENTRAINMENT OF SOLID PARTICLES AT THE OUTLET FROM A THREE-PHASE FLUIDIZED BED

(71) Applicant: AXENS, Rueil Malmaison (FR)

(72) Inventor: Jean-Francois Le Coz, Saint Germain en Laye (FR)

(73) Assignee: AXENS, Rueil Malmaison (FR)

( * ) Notice: Subject to any disclaimer, the term of this patent is extended or adjusted under 35 U.S.C. 154(b) by 432 days.

(21) Appl. No.: 15/534,562

(22) PCT Filed: Nov. 13, 2015

(86) PCT No.: PCT/EP2015/076614
§ 371 (c)(1),
(2) Date: Jun. 9, 2017

(87) PCT Pub. No.: WO2016/091538
PCT Pub. Date: Jun. 16, 2016

(65) Prior Publication Data
US 2017/0341046 A1    Nov. 30, 2017

(30) Foreign Application Priority Data
Dec. 11, 2014   (FR) ..................... 1462230

(51) Int. Cl.
*B01J 8/00* (2006.01)
*B01J 8/22* (2006.01)
(52) U.S. Cl.
CPC ............. *B01J 8/0065* (2013.01); *B01J 8/22* (2013.01)

(58) Field of Classification Search
CPC .............. B01J 8/00; B01J 8/22; B01J 8/0065
See application file for complete search history.

(56) References Cited

U.S. PATENT DOCUMENTS

| 2,728,632 | A | | 12/1955 | Matheson |
| 3,309,305 | A | | 3/1967 | Scott |
| 4,618,418 | A | * | 10/1986 | Heijnen ............... C02F 3/2806 210/151 |
| 5,474,688 | A | * | 12/1995 | Hedrick ............ B01D 21/0003 210/521 |
| 6,309,553 | B1 | | 10/2001 | Lanting et al. |
| 6,623,640 | B2 | | 9/2003 | Lanting et al. |

(Continued)

FOREIGN PATENT DOCUMENTS

| FR | 2963893 A1 | 2/2012 |
| WO | 01/23062 A1 | 4/2001 |
| WO | WO-0123062 A1 * | 4/2001 ............ B01D 3/009 |

OTHER PUBLICATIONS

International Search Report dated Feb. 11, 2016 issued in corresponding PCT/EP2015/076614 application (pp. 1-3).

*Primary Examiner* — Youngsul Jeong
(74) *Attorney, Agent, or Firm* — Millen White Zelano & Branigan (57) ABSTRACT

The present invention concerns a device for limiting the entrainment of solid particles placed inside a three-phase fluidized reactor, said device being constituted by an assembly of flat or truncated cone-shaped plates ranked vertically in one or more rows, and the maximum horizontal cross section area of the device being in the range 1 to 10 times the horizontal cross section area of the outlet pipework for the gas effluents. It also concerns a three-phase process employing said device.

17 Claims, 6 Drawing Sheets

(56) References Cited

U.S. PATENT DOCUMENTS

| | | |
|---|---|---|
| 9,174,153 B2 | 11/2015 | Llamas et al. |
| 9,546,330 B2 * | 1/2017 | Koseoglu ............... C10G 65/12 |
| 2002/0000409 A1 | 1/2002 | Lanting et al. |
| 2013/0186273 A1 * | 7/2013 | Llamas ................. B01D 45/08 95/272 |

* cited by examiner

DEVICE FOR LIMITING ENTRAINMENT OF SOLID PARTICLES AT THE OUTLET FROM A THREE-PHASE FLUIDIZED BED

FIELD OF THE INVENTION

The invention relates to the field of three-phase reactors operated in ebullated bed mode. This type of reactor is used in refining for the conversion of heavy oil cuts such as residues obtained from atmospheric distillations or from vacuum distillations of oil or oil fractions, for example. The term "three-phase" means that three phases are present in the reaction medium: a solid phase corresponding to particles of catalyst, a liquid phase corresponding to the feed to be treated, and a gas phase generally corresponding to the hydrogen used to carry out the hydrotreatment or hydroconversion reactions.

The term "ebullated bed" means a three-phase bed in which the solid particles are fluidized by the liquid phase, the gas phase passing through the fluidized medium in the form of bubbles. An ebullated bed is distinguished from a three-phase type bed with a catalyst in suspension (slurry) in that in a slurry, the solid phase is dispersed within the liquid phase due to the very small size of the solid particles.

EXAMINATION OF THE PRIOR ART

Documents in the prior art which may be cited include the following: The patent FR 2 963 893 describes a process for reducing the entrainment of solid obtained from a two-phase gas/solid mixture, the solid being fluidized by the gas. That process comprises a step for separating the solid particles entrained by the gas by means of a contact means placed in a portion of the fluidized bed.

Processes for separating a liquid/gas mixture also exist in which the liquid phase may also contain a solid ("slurry" type suspension). Mixtures of this type exist, for example, in processes for the conversion of hydrocarbon feeds or for hydrotreatment.

The patent EP 1 374 962 B1 describes a device for separating a two-phase liquid/gas mixture comprising means for separating and withdrawing the liquid phase, in which the liquid phase may comprise a solid such as, for example, solid particles of catalyst. That type of device is intended to improve the separation of liquid or solid/liquid phases in the gas phase, the particles of solids being maintained in suspension in the liquid phase. In particular, it comprises a recycle cap and a conduit which extends the lower portion of that cap, as well as recycling and withdrawal means.

BRIEF DESCRIPTION OF THE FIGURES

FIG. 3d shows the angles at which the plates are orientated.

BRIEF DESCRIPTION OF THE INVENTION

The invention concerns a three-phase fluidized bed process of the ebullated bed type using an internal device installed in the reactor and intended to receive the three-phase liquid-gas-solid mixture. This device has a geometry suitable for fragmenting the bubbles of the gas phase and preventing entrainment of solid particles by this gas phase, in particular by the largest bubbles of said gas phase. The invention also concerns the three-phase ebullated bed process employing said reactor provided with the described contact means.

More precisely, the present invention can be defined as a three-phase fluidized bed process of the ebullated bed type, said process using a device for limiting entrainment of solid particles, said device being placed inside a three-phase fluidized reactor.

The three-phase fluidized reactor has two levels, a first level of solid 13 corresponding to expansion of said solid within the liquid phase, then above said first level, a second level of liquid 14 which in principle no longer contains solid particles, said device being placed between the two preceding levels, and being constituted by an assembly of flat or truncated cone-shaped plates ranked vertically in one or more rows, and the maximum horizontal cross section area of the device being in the range 1 to 10 times the horizontal cross section area of the outlet pipework for the effluents 9, preferably in the range 2 to 8 times, and highly preferably in the range 4 to 6 times the horizontal cross section area of the outlet pipework for the effluents 9.

In accordance with the first variation of the present invention, the plates 11 constituting the device are flat. Said flat plates 11 are disposed in the form of a plurality of rows which are ranked vertically, each row comprising a certain number of parallel plates disposed parallel with respect to each other and being inclined at an angle $\alpha$ with respect to the horizontal, the angle $\alpha$ being in the range 10° to 80°, preferably in the range 20° to 60°.

In the same variation of the present invention, the successive rows of parallel plates 11 have alternating inclinations, the angle of inclination $\alpha 1$ to the horizontal of one row and the angle of inclination $\alpha 2$ to the horizontal of the subsequent row being such that the sum of the angles $\alpha 1 + \alpha 2$ is in the range 140° to 220°, preferably in the range 160° to 200°, and highly preferably in the range 165° to 190°.

In accordance with this particular variation of the device, the rows of plates 11 are disposed in an alternating manner, one row of plates 11 with an angle $\alpha 1$ with respect to the horizontal then a subsequent row with an angle $\alpha 2$ with respect to the horizontal, then again a row with an angle $\alpha 1$, and again a row with an angle $\alpha 2$, and so on for the subsequent rows when they exist.

The number of rows of plates 11 of the device is generally in the range 2 to 6, and preferably in the range 2 to 4.

Figure 4:
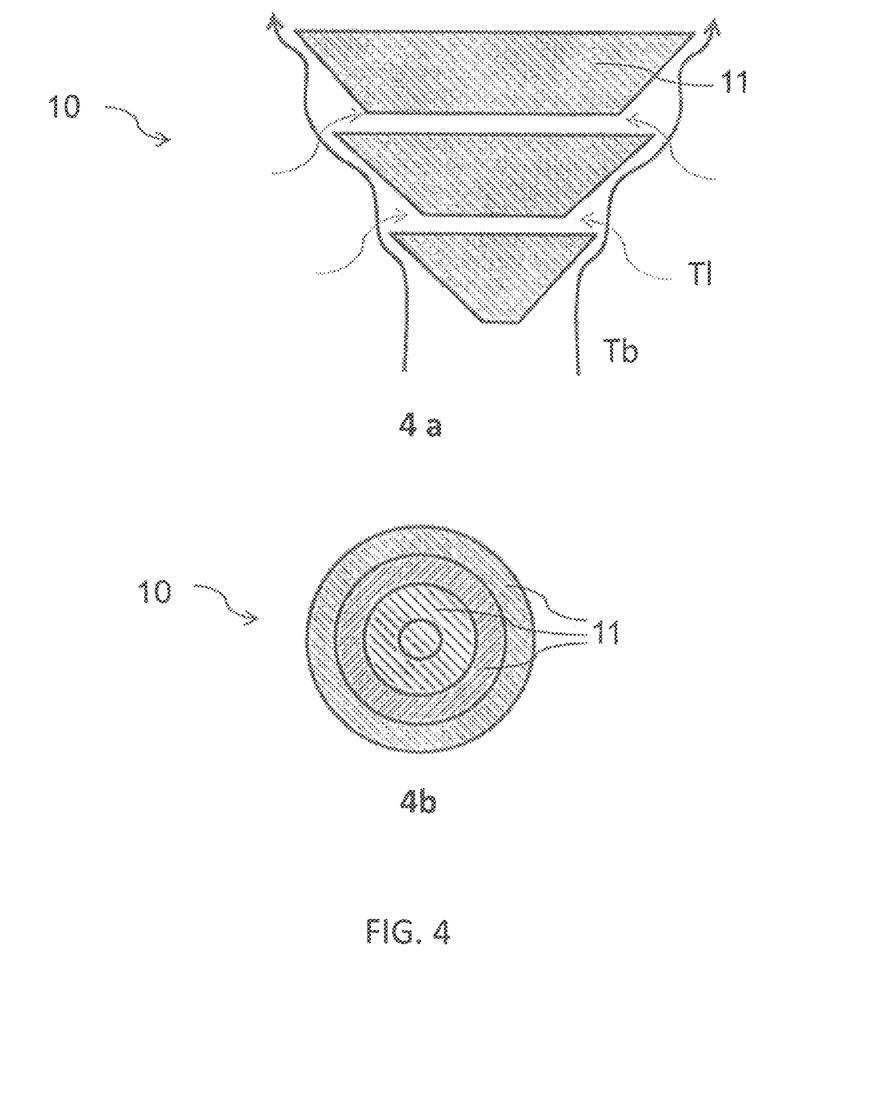
FIG. 4 corresponds to a variation of the device in accordance with the invention, in which the plates have a truncated conical shape and are no longer aligned, but are superimposed vertically.

In accordance with a second variation of the device in accordance with the invention, said device is constituted by a vertical stack of plates with a truncated conical shape which are mutually concentric (in accordance with FIG. 4), the diameter of which increases from bottom to top, the device being centred with respect to the section of the reactor and occupying a horizontal cross section area in the range 2 to 8 times, preferably in the range 4 to 6 times the horizontal cross section area of the outlet pipework for the effluents 9.

In accordance with this second variation of the device in accordance with the invention, the number of superimposed truncated cone-shaped plates is in the range 2 to 6, preferably in the range 2 to 4.

The present invention also concerns any three-phase fluidized bed process of the ebullated bed type using the device described above, in which process the superficial velocity of the gas is in the range 2 to 10 cm/s, and preferably in the range 4 to 8 cm/s, and the superficial velocity of the liquid is in the range 1.4 cm/s to 5.6 cm/s, preferably in the range 2 cm/s to 4 cm/s.

DETAILED DESCRIPTION OF THE INVENTION

Figure 1:
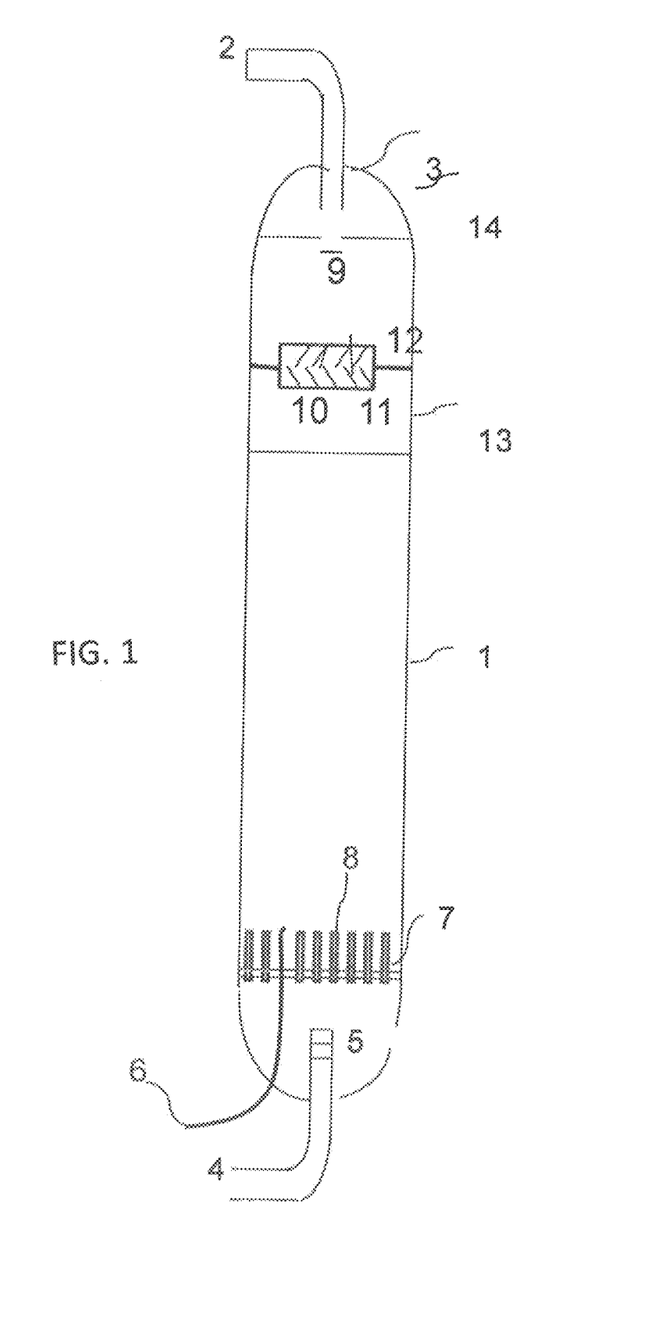
FIG. 1 represents a view of a three-phase reactor provided with a device in accordance with the invention placed between the first level 13 and the second level 14. The precise definition of the first and second levels is provided in the description.

FIG. 1 shows a basic layout of a three-phase reactor comprising the device in accordance with the invention. The reactor 1 comprises, in its lower portion, a catalyst supply 6, a supply for the generally hydrocarbon feed 4, comprising a system 5 for the introduction of said liquid feed, generally mixed with the reagent gas, a distributor plate 7 generally provided with risers 8 which allow for correct distribution of the gas-liquid feed within the reactor.

The present device is also applicable when the gas and the liquid are introduced separately into the reactor 1.

In its upper portion, the three-phase reactor 1 comprises a conduit for evacuation of gaseous effluents 2 provided with additional holes 3 in order to attenuate aspiration phenomena.

The device in accordance with the present invention operates to fragment the large bubbles contained in the liquid phase which might entrain a portion of the solid particles in their wake. Because of the device in accordance with the invention, the process may be operated at superficial velocities of gas which are higher than normal, without increasing the losses of solid catalyst, which therefore means that the capacity of a unit can be increased For a better understanding of the device of the present invention, it is worth recalling a few general points regarding three-phase fluidized beds.

In the processes employing a three-phase bed, the continuous phase is most generally the liquid phase; thus, this liquid phase is what fluidizes the solid.

In a three-phase fluidized reactor, a first level of solid 13 corresponding to expansion thereof is established in the liquid phase, then above said first level, a second level of liquid 14 which in principle no longer contains solid particles is established. Above this second level of liquid, in principle, only the gas phase resulting from the coalescence of bubbles is found.

However, in many three-phase systems, the large bubbles have a tendency to entrain the liquid phase with the solid which it contains above the level of the bed of fluidized solid 13. The device in accordance with the invention can be used to break these large bubbles and thus minimize the entrainment of solid towards the exterior of the reactor. The presence of holes in the plates 11 of the device in accordance with the invention also contributes significantly to breaking up the large bubbles.

The device in accordance with the present invention is disposed between the maximum level of expansion of the bed of solid in the liquid 13 and the upper level of the liquid phase in the reactor 14. It is preferably located at a distance in the range 30% to 90%, more preferably 50% to 85% of the distance included between the levels 13 and 14, said distance being measured from the maximum level of expansion of solid in the liquid 13.

The device in accordance with the present invention is essentially constituted by an ordered series of perforated plates 11. The holes 15 of each of the plates 11 prevent too large an increase in the pressure drop in the reactor.

Preferably, the diameter of the holes is smaller than the maximum dimension of the bubbles in the liquid. In general, the size of the bubbles in the invention is in the range 1 cm to 5 cm. Furthermore, in some cases it is better not to select sizes which are too small in order to avoid phenomena of clogging due to deposits which may be contained in the feed.

Figure 2:
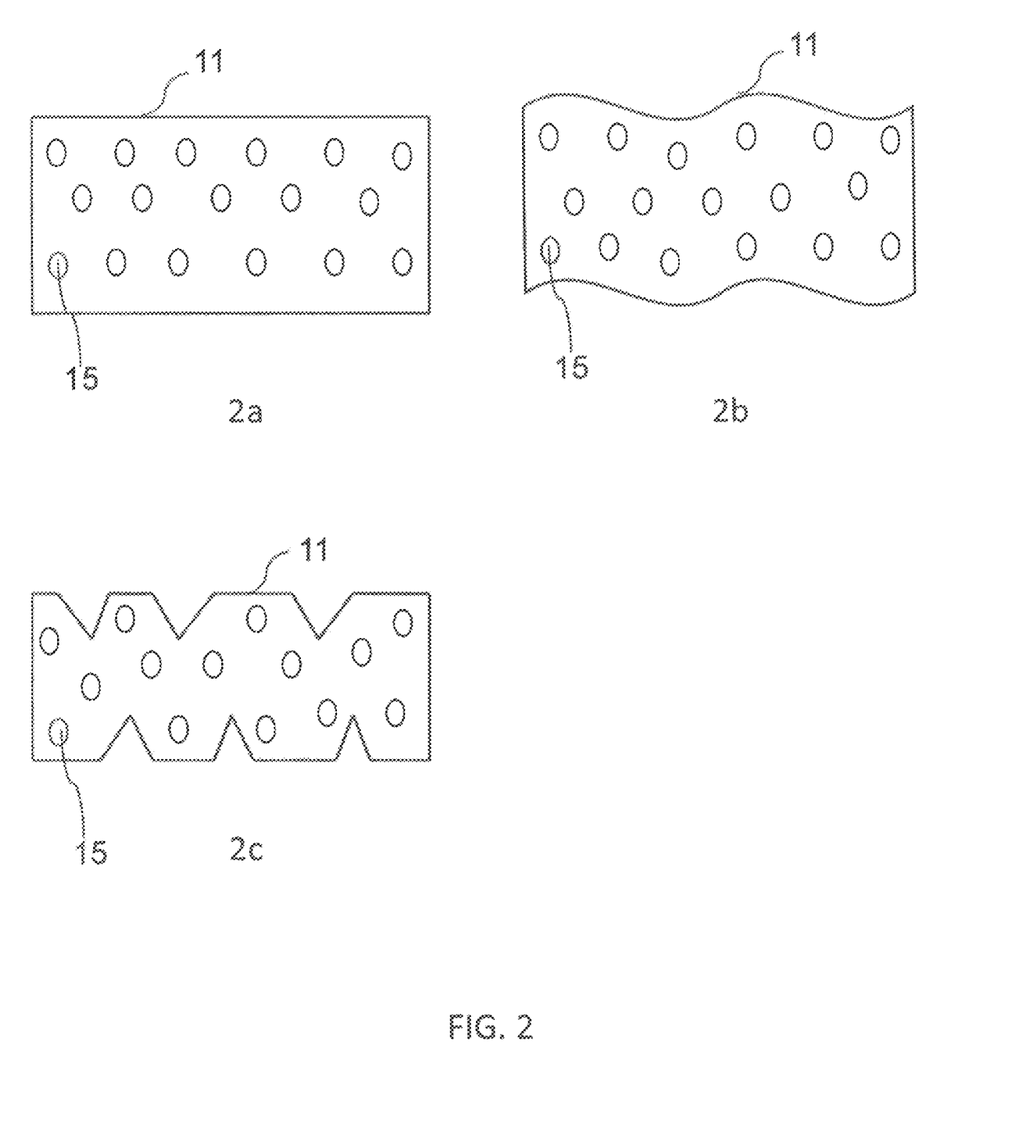
FIGS. 2a, 2b, and 2c each represents various types of plates constituting the device in accordance with the invention.

The device is constituted by an assembly of perforated plates 11 which are substantially parallel with respect to each other, as can be seen in FIG. 2. The width of a plate is preferably in the range 5 cm to 50 cm, more preferably in the range 10 cm to 30 cm.

In accordance with a preferred embodiment of the invention, these plates include holes 15, preferably with a diameter in the range 0.5 to 10 cm, more preferably in the range 0.8 to 7 cm, and yet more preferably in the range 1 to 5 cm.

These holes are preferably spaced apart from each other by a spacing which is preferably in the range 1 to 5 times their diameter, and more preferably in the range 2 to 3 times their diameter. They are preferably disposed in a triangular pattern, and more preferably disposed equidistantly from each other.

The fixing means 12 are generally constituted by a set of bars, for example with a round, square or triangular section, which may be perforated, and which have a small diameter compared with the smallest dimension of the device, so that the set of fixing elements of the device do not occupy more than 10% of the horizontal cross section area of the reactor 1, and preferably less than 5% of said horizontal cross section area.

The plates 11 preferably have a shape which is close to a rectangular shape (FIG. 2a). In a variation, they may have non-rectilinear edges, such as sinusoidal profiles, for example (FIG. 2b), triangular notches (FIG. 2c) or indeed notches in the form of a circular arc, a square or a rectangle, or a trapezoid (not shown in FIG. 2).

These notches function to minimize clogging by deposition of precipitates agglomerating on the edges of the contact means. They can be used to reduce the regions on the edges where the heavy or clogging products accumulate before falling under gravity.

FIGS. 3c and 3d show a view of a vertical section of the device 10 with plates 11 disposed inside the device. This vertical section of the device 10 may, for example, be rectangular in shape (FIG. 3c), or indeed, and preferably, it may be trapezoidal (FIG. 3e). When said section is trapezoidal, the smallest horizontal projection of the trapezoid 16 is disposed towards the bottom, and thus lower than the largest projection of the trapezoid 17. Preferably, the two lateral faces 18 have the same dimensions, but the rectangle or trapezoid may be slightly deformed with a difference of + or −10% between the dimensions of the lateral faces 18 without having any impact on the performances of the device.

FIGS. 3a and 3b present preferred top views for the device in accordance with the invention 10. It is possible to associate the geometries of FIG. 3a or 3b with each of the geometries of FIGS. 3c and 3e (vertical section as a rectangle or trapezoid), the four corresponding configurations being preferred in the invention.

Figure 3:
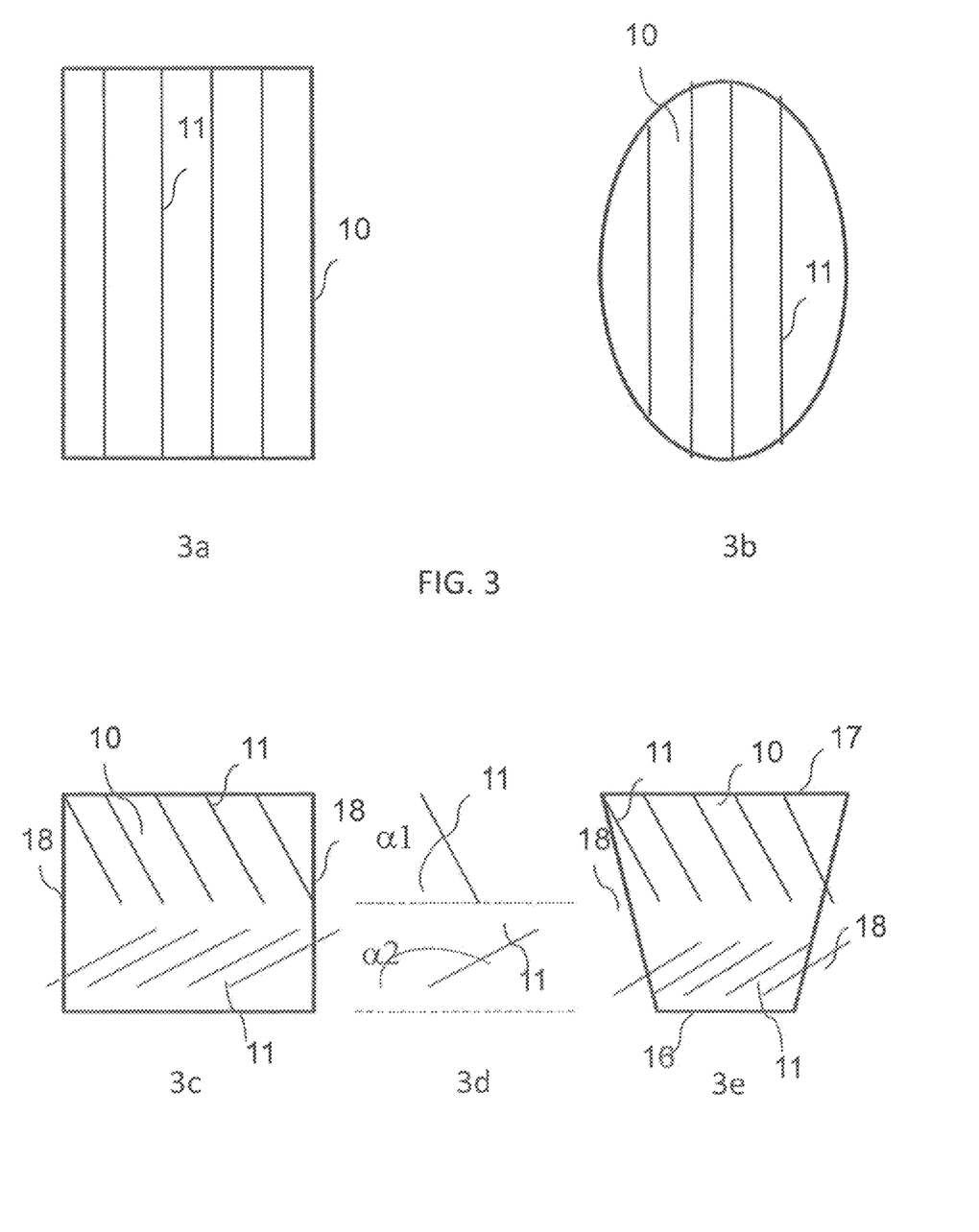
FIG. 3 represents the device in top view (FIGS. 3a and 3b) and in side view FIGS. 3c and 3e).

The plates 11 are preferably disposed parallel with respect to each other (FIG. 3) and are generally inclined at an angle α with respect to the horizontal. The device in accordance with the invention may optionally comprise a plurality of rows of plates (FIGS. 3c and 3e).

In this case, for greater efficiency, the inclination of two successive rows of the plates (FIG. 3c, 3e) is preferably inverted for two successive rows. The first row is then inclined at an angle α1, the second at an angle α2 (FIG. 3d), the third at an angle α1 (not shown), and so on.

It is also possible to alternate the layers by crossing them at 90° with respect to each other, this crossing of the layers being carried out in a substantially horizontal plane (not shown in the figures).

In general, the sum of the angles α1+α2 is in the range 140° to 220°, preferably in the range 160° to 200°, and highly preferably in the range 165° to 190°, and yet more preferably in the range 170° to 185°.

Depending on the dimensions of the plates 11 and the value of the angles α1 and α2, in one embodiment of the invention it is possible to provide 2 rows, preferably at least 3 rows or even at least 4 rows of plates with different angles α1 and α2 for each row.

In accordance with another preferred embodiment, it is possible to alternate one row with an angle α1 then one row with an angle α2, then again one row with an angle α1, and possibly again one row with an angle α2, and so on for the subsequent rows when they exist.

Another embodiment consists of no longer using flat plates, but using truncated cone-shaped plates with a diameter which increases from bottom to top, these plates being superimposed with a free space between two successive plates, as exemplified in FIGS. 4a and 4b. The device is then preferably centred on the axis of the outlet conduit for the effluents 2 located in the upper portion of the reactor vessel.

The fact of superimposing the truncated cone-shaped plates as described in FIG. 4a and not of juxtaposing them in the same plane provides a supplemental advantage, which is to orientate the large bubbles towards the walls of the reactor and at the same time to distance them from the axis of the outlet for effluents 9. This disposition can thus very significantly reduce the probability that the solid particles carried in the wake of these large bubbles will not reach the outlet for effluents 9. The flows Tb and Tl indicate the principal paths respectively taken by the bubbles and the liquid.

The number and length of the plates are calculated in a manner such that the device in accordance with the invention has a horizontal cross section area in the range 1 to 10 times the horizontal cross section area of the outlet pipework for the effluents 9, preferably in the range 2 to 8 times, and highly preferably in the range 4 to 6 times the horizontal cross section area of the outlet pipework for the effluents 9.

Preferably, the device in accordance with the invention is disposed in a manner which is substantially horizontal and centred inside the reactor, substantially in line with the outlet pipework 9. The deflection from the horizontal is preferably less than 10%, and more preferably less than 5% in terms of the angle with respect to the horizontal.

COMPARATIVE EXAMPLES

Figure 5:
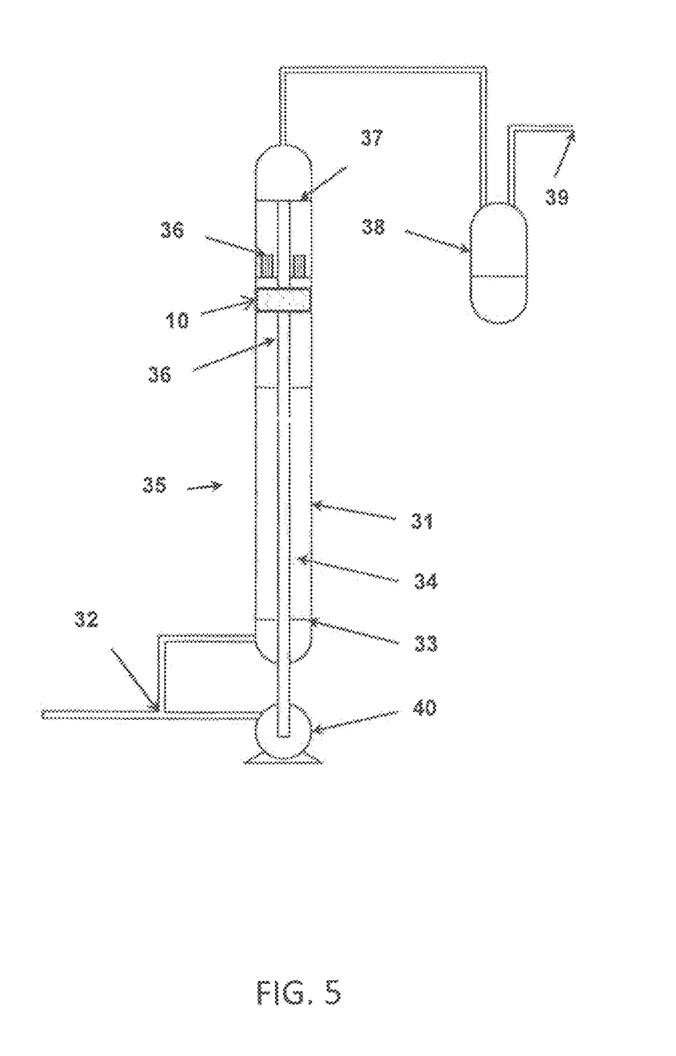
FIG. 5 shows the layout for a mock-up of a fluidized ebullated bed used for the examples forming part of the present application.

In order to demonstrate the effect of the device in accordance with the invention on the entrainment of solid particles, an experimental study was carried out in a mock-up constituted by a glass three-phase column, as can be seen in FIG. 5. This study was intended to demonstrate the effect of the device in accordance with the present invention by comparison with a mock-up not using this device.

The reference numerals in FIG. 5 correspond to the following elements:

31: three-phase bubble column with a diameter of 150 mm and a height of 3300 mm
32: supply of gas to liquid
33: distribution screen and catalyst bed support
34: bed of catalyst
35: direction of liquid (ascending at the periphery and descending at the centre) and gas (ascending)
36: outlet screen with risers, retaining the entrained solid
37: level of liquid
38: external separator: gas/liquid settler
39: gas outlet
40: liquid recirculation pump
41: liquid downflow conduit
10: device in accordance with the invention (also with reference number 10 in FIGS. 1 to 4).

The liquid used was heptane and the gas was nitrogen, these two fluids being mixed by means of the arriving liquid recirculated via the pump 40 and the supply of gas via the line 32, and injected into the bottom of the column below the distributor plate 33. The solid particles of catalyst (cylindrical in shape and with a diameter of 1 mm and length of 3 to 6 mm) were kept fluidized in an expanded bed 34 by means of the drag forces generated by the gas and the liquid, essentially the liquid.

Above the fluidized bed, risers equipped with screens 36 retained the particles removed and entrained by the upward movement of the bubbles of gas. After a certain period of operation, these screens were dismantled and the trapped particles of solid were weighed and the mass was related to the operating period, which provided the level of entrainment per unit of time.

The bubbles of gas rose to the upper gas/liquid interface 37.

The gas then went towards an external separator 38, then to a vent 39. The liquid was directed towards the recirculation pump 40 via a central pipework 41 provided in the transparent column.

The flow rates of gas and liquid were controlled independently to ensure that the bed of catalyst was expanded by 25% to 45% with respect to its height at rest.

The flow rate of liquid was kept fixed in order to ensure a superficial liquid velocity of 3.5 cm/s, and the flow rate of the gas was modified to between 0 and 10 cm/s.

Three experiments were carried out:
(A) an experiment in which no device was used to fragment the bubbles.
(B) an experiment in which a device in accordance with the invention constituted by an assembly of solid plates inclined at 45° and disposed as shown in FIG. 3c was used.

The device had a horizontal cross section area corresponding to 4 times the horizontal cross section area of the outlet pipework of the column 31 going towards the external separator 38, i.e. 0.015 m$^2$.

(C) an experiment in which the same device as in (B) was used, but this time, the plates were perforated with holes with a diameter of 2.5 cm spaced 5 cm apart in a triangular pattern, thereby maximizing the number of holes.

The device in accordance with the invention 10 was placed below the risers 36 at a distance of 50 cm with respect to the plane of the risers 36.

Figure 6:
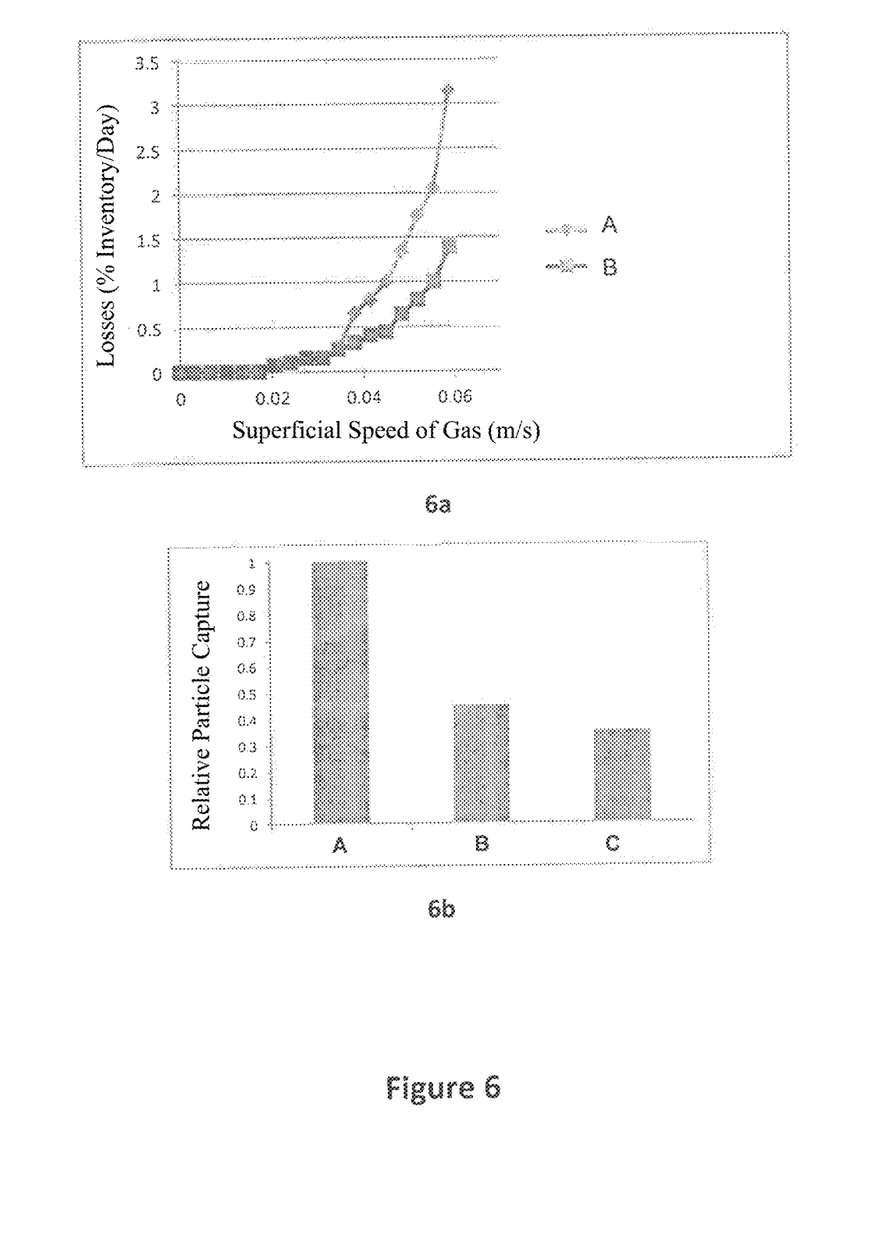
FIG. 6 can be used to illustrate the performances of the device in accordance with the invention compared with a reactor without a device; see the curves (FIG. 6a) or the histograms (FIG. 6b).

The result of experiments (A) and (B) is summarized in the graph of FIG. 6a, which shows the variation in the losses of solid particles expressed as a percentage of the daily consumption of catalyst in the reactor, as a function of the superficial velocity of gas (Vsg) in the absence of the device in accordance with the experiment (A) and with a device provided with plates in accordance with experiment (B).

It will be seen in this FIG. 6a that the use of the device in accordance with the invention constituted by plates without holes means that the losses of solid particles could be reduced by a factor of approximately 2 within the normal range of operation of an ebullated bed hydrotreatment reactor, i.e. with a superficial gas velocity (Vsg) in the range 2 cm/s to 6 cm/s. In this experiment, the improvement is significant for a superficial gas velocity of more than 4 cm/s.

Another experiment (C) was carried out with the same device in the form of inclined plates, but this time the plates were provided with 2.5 cm diameter holes.

FIG. 6b compares the results obtained without the device (A), with the device comprising the solid plates (B) and with the device provided with plates perforated with holes (C). This last experiment (C) demonstrates an additional gain for the same superficial gas velocity of 6 cm/s.

The ordinate of the graph of FIG. 6b is expressed as a fraction of the entrainment of solid particles, the reference entrainment corresponding to that obtained without the device.

The invention claimed is:

1. A fluidized catalytic process comprising subjecting a feed to a catalyst in a three-phase gas, liquid, solid ebullated bed reactor thereby conducting a fluidized catalytic reaction, wherein the three-phase gas, liquid, solid ebullated bed rector comprises a device limiting the entrainment of solid particles placed inside the three-phase gas, liquid, solid ebullated bed reactor having two levels, a first level of solid (13) corresponding to expansion of the solid phase within the liquid phase, then above said first level, a second level of liquid (14) which in principle no longer contains solid particles, said device being centered inside of the three-phase gas, liquid, solid ebullated bed reactor, in line with outlet pipework (9) for gas effluents, said device being placed between the first and the second levels, and being an assembly of flat or truncated cone-shaped plates (11) disposed in the form of a plurality of rows which are ranked vertically, wherein the flat or truncated cone-shaped plates (11) comprise a plurality of holes, and the maximum horizontal cross section area of the device being 1 to 10 times horizontal cross section area of the outlet pipework (9) for gas effluents, wherein bubbles of the gas phase are fragmented inside the device limiting the entrainment of solid particles, and wherein the fragmented bubbles traverse the device toward the outlet pipework (9).

2. The fluidized catalytic process as claimed in claim 1, in which the gas in the three-phase gas, liquid, solid ebullated bed rector has a superficial velocity of 2 to 10 cm/s.

3. The fluidized catalytic process according to claim 1, in which the liquid in the three-phase gas, liquid, solid ebullated bed rector has a superficial velocity of 1.4 cm/s to 5.6 cm/s.

4. The fluidized catalytic process according to claim 1, wherein the device comprises a certain number of flat plates (11) disposed in the form of a plurality of rows which are ranked vertically, each row comprising a certain number of parallel plates disposed parallel with respect to each other and being inclined at an angle α with respect to the horizontal, the angle α being in the range 10° to 80°.

5. The fluidized catalytic process according to claim 4, wherein in the device successive rows of parallel, flat plates (11) have alternating inclinations, the angle of inclination (α1) with respect to the horizontal of one row and the angle of inclination (α2) with respect to the horizontal of the subsequent row being such that the sum of the angles (α1+α2) is 140° to 220°.

6. The fluidized catalytic process according to claim 4, wherein in the device one row of flat plates (11) is disposed with an angle (α1) with respect to the horizontal, alternating with a subsequent row with an angle (α2) with respect to the horizontal, then again a row with an angle (α1), and again a row with an angle (α2), and so on for the subsequent rows when they exist.

7. The fluidized catalytic process according to claim 4, wherein in the device the number of rows of flat plates (11) of the device is 2 to 6.

8. The fluidized catalytic process according to claim 1, comprising contacting a hydrocarbon feed with a catalyst and hydrogen in the three-phase gas, liquid, solid ebullated bed reactor.

9. The fluidized catalytic process according to claim 1, wherein the maximum horizontal cross section area of the device is 4 to 6 times the horizontal cross section area of the outlet pipework (9) for gas effluents.

10. The fluidized catalytic process as claimed in claim 1, in which the gas in the three-phase gas, liquid, solid ebullated bed rector has a superficial velocity of 4 to 8 cm/s.

11. The fluidized catalytic process according to claim 1, in which the liquid in the three-phase gas, liquid, solid ebullated bed rector has a superficial velocity of 2 cm/s to 4 cm/s.

12. The fluidized catalytic process as claimed in claim 1, wherein the holes have a diameter of 0.5 to 10 cm.

13. The fluidized catalytic process as claimed in claim 1, in which the outlet pipework (9) is located in an upper portion of the three-phase gas, liquid, solid ebullated bed reactor.

14. A fluidized catalytic process comprising subjecting a feed to a catalyst in a three-phase gas, liquid, solid ebullated bed reactor thereby conducting a fluidized catalytic reaction, wherein the three-phase gas, liquid, solid ebullated bed rector comprises a device limiting the entrainment of solid particles placed inside the three-phase gas, liquid, solid ebullated bed reactor having two levels, a first level of solid (13) corresponding to expansion of the solid phase within the liquid phase, then above said first level, a second level of liquid (14) which in principle no longer contains solid particles, said device being placed between the first and the second levels, and being an assembly of flat or truncated cone-shaped plates (11) disposed in the form of a plurality of rows which are ranked vertically, wherein the flat or truncated cone-shaped plates (11) comprise a plurality of holes, and the maximum horizontal cross section area of the device being 1 to 10 times horizontal cross section area of the outlet pipework (9) for the gas effluents, wherein bubbles of the gas phase are fragmented inside the device limiting the entrainment of solid particles, and wherein the fragmented bubbles traverse the device toward the outlet pipework (9).

15. The fluidized catalytic process according to claim 14, wherein the device comprises a vertical stack of plates with a truncated cone-shaped which are mutually concentric, the diameter of which increases from bottom to top, the device being centered with respect to the horizontal cross section of the reactor and occupying a horizontal cross section area 2 to 8 times the horizontal cross section area of the outlet pipework (9) for gas effluents.

16. The fluidized catalytic process according to claim 15, wherein in the device the number of truncated cone-shaped plates is 2 to 6.

17. A fluidized catalytic process comprising subjecting a feed to a catalyst in a three-phase gas, liquid, solid ebullated bed reactor thereby conducting a fluidized catalytic reaction, wherein the three-phase gas, liquid, solid ebullated bed rector comprises a device limiting the entrainment of solid particles placed inside the three-phase gas, liquid, solid ebullated bed reactor having two levels, a first level of solid (13) corresponding to expansion of the solid phase within the liquid phase, then above said first level, a second level of liquid (14) which in principle no longer contains solid particles, said device being placed between the first and the second levels, and being an assembly of flat or truncated cone-shaped plates (11) disposed in the form of a plurality of rows which are ranked vertically, wherein the flat or truncated cone-shaped plates (11) comprise a plurality of holes, and the maximum horizontal cross section area of the device being 1 to 10 times horizontal cross section area of the outlet pipework (9) for gas effluents, wherein bubbles of the gas phase are fragmented inside the device limiting the entrainment of solid particles, and wherein the fragmented bubbles traverse the device toward the outlet pipework (9) located in an upper portion of the three-phase gas, liquid, solid ebullated bed reactor, said maximum horizontal cross section area of the device further being smaller than the horizontal cross section area of the three-phase gas, liquid, solid ebullated bed reactor.

* * * * *